April 8, 1958

W. R. TRUSWELL 2,829,418

APPARATUS AND METHOD FOR FORMING A HOLLOW
BODY OF CONCRETE OR THE LIKE
Filed Dec. 2, 1953

INVENTOR.
William R. Truswell
BY
George F. Des Marais
ATTORNEY

United States Patent Office 2,829,418
Patented Apr. 8, 1958

2,829,418

APPARATUS AND METHOD FOR FORMING A HOLLOW BODY OF CONCRETE OR THE LIKE

William R. Truswell, East Orange, N. J., assignor to Lock Joint Pipe Company, East Orange, N. J., a corporation of New Jersey Application December 2, 1953, Serial No. 395,805

5 Claims. (Cl. 25—30)

This invention is concerned with an apparatus and a method for forming a hollow body of concrete or similar material and is directed particularly to improvements in the use of moulding apparatus wherein a mould is suspended from a roller or shaft, and is rotated by the roller during the moulding of the concrete within the mould. The mould includes a cylindrical shell and two spaced-apart mould ends in the form of annular members through which the roller extends.

In this type of apparatus the moulding material, preferably a relatively dry concrete mix or other cementitious material, is supplied to the mould as the mould rotates. The moulding material is distributed circumferentially around the mould as the mould rotates. The ultimate compaction of the concrete occurs when the material builds up to an inside diameter less than the inside diameter of the mould ends. With this condition prevailing the mould and its contents are supported on the roller by the compacted material. Because the annular members of the mould are out of contact with the roller, the roller will impress a longitudinal groove in the moulded material when the mould is brought to rest. This groove appears in the finished product as an interruption in the continuity of the inner surface of the moulded product. This result is desired to be avoided, and it is among the objects of the present invention to provide an apparatus and a method for moulding a hollow concrete body with a smooth inside surface continuous without interruption throughout its inner circumference.

In the apparatus of the present invention, one end of the roller shaft is supported in bearings mounted on a stationary base. The other or outboard end of the roller shaft is supported in a bearing which is mounted upon a movable frame or carriage. By displacing the carriage the outboard bearing is removed from supporting engagement with the end of the roller. The carriage is so arranged and constructed as to facilitate the placement of the outboard end of the roller in its bearing housing or pillow block.

The carriage is provided with means in the form of a cradle or cradles for supporting the mould for placing the mould over the roller shaft, or for removing the mould from the apparatus. The cradles carry wheels for engaging the mould, and means are provided for gradually raising the cradles with the mould on the wheels while the mould is rotating and approaching the conclusion of a moulding operation. The apparatus enables finishing the interior of the moulded body in a continuous circumferential surface by gradually breaking contact between the compacted cementitious material and the roller as the mould and contents are freed from the roller shaft.

A more comprehensive understanding of the invention may be had by referring to the accompanying drawing, in which:

Fig. 1 shows an elevation of the apparatus with part of the mould broken away;

Fig. 2 is a horizontal section of the carriage on line 2—2 of Fig. 1;

Fig. 3 is an end elevational view of the carriage; and

Fig. 4 diagrammatically illustrates the relationship of the mould and the roller toward the end of a moulding operation.

In the drawing, the roller or suspension shaft 10 is journalled in bearings 11 and 12 which are mounted upon a frame 13. These bearings are capable of supporting the roller in cantilever fashion and at least one of the bearings is a thrust bearing.

The other or outboard end of the roller 10 is journalled in a pillow block 14 which contains a bearing 15. Any conventional type of expansion bearing unit which allows relative lineal movement between the bearing pillow block and the roller may be used. The pillow block 14 is mounted on a cross-member 16 of a carriage 17. The pillow block 14 is aligned on the axis of the bearings 11 and 12. The carriage 17 is mounted to move along rails 18 disposed parallel to the roller and as the carriage is moved endwise toward the position shown in Fig. 1, the pillow block is presented for the entry of the end of the roller therein.

The carriage 17 comprises a rigid open frame-work structure including a lower rectangular frame made up of connected members 19, 20, 21 and 22. The frame has depending brackets 23 for journalling the axles 24 and 25. The axles 24 and 25 each have mounted thereon a pair of wheels 26 and 27 which rest on the rails 18. The cross-member 16 of the carriage is supported by a pair of standards 28 and 29 extending upward from the lower frame.

The carriage 17 is provided with means for supporting and elevating the mould and which may comprise a single platform or a cradle supporting wheels mounted on axles parallel to the roller shaft 10.

In the drawing there are illustrated two cradles 30 and 31 independently supported but operable simultaneously for raising the mould. It will suffice to describe one of these cradles and its function since both of the cradles are similarly constructed. Each cradle has two side beams 32 and 33 which are pivoted on a bolt 34 carried by an upstanding channel member 35. The other ends of the side beams are connected by a cap 36 which is supported by a jack 37. The cradle is guided for movement in a vertical plane by the post 38. The bolt 34 may be adjusted to engage any pair of the several openings 39 in the channel member 35 to accommodate the manufacture of pipes of different sizes. When the position of the bolt 34 is changed to accommodate a mould of a given size, the bracket 40 upon which the jack 37 is mounted is likewise adjusted for locating the cradles in an approximately horizontal plane. This is accomplished by bolting the bracket 40 to the post 38 through selected holes 41 in the post. It will be understood that both cradles 30 and 31 are similarly adjusted. Each cradle carries a pair of flanged wheels 42 and 43 whose axles are journalled in the side beams 32 and 33. Several journals 44 and 45 provide for spacing the wheels 42 and 43 to support moulds of different sizes.

Preliminarily to a moulding operation, the carriage is located away from the outboard end of the roller shaft 10 and the mould is mounted upon the pairs of wheels 42 and 43, the jacks having been raised sufficiently for the mould to clear the shaft 10 and the collar 46 when the carriage is moved along its rails. The carriage is then moved along the rails and the outboard bearing end of the roller shaft enters the pillow block 14. With the mould located between the collars 46 and 47, the carriage is locked in fixed position by the latches 48 and 49.

The jacks 37 are then lowered sufficiently to lower the mould and rest the end rings 50 and 51 upon the roller shaft 10. The collars 46 and 47 are secured to the roller shaft and limit the axial movement of the mould. With the mould wholly supported on the roller shaft the apparatus is ready for a moulding operation. The mould is supplied with the moulding material as the roller shaft and the mould rotate. The roller shaft 10 is driven by a motor 52 through a belt and pulley connection 53.

As the mould rotates, the moulding material is distributed circumferentially around the mould and is compacted into a dense solid wall by the action of the roller shaft. The maximum compaction of the material is obtained when the quantity of material supplied to the mould becomes sufficient to raise the mould from direct engagement with the roller shaft. As this occurs the end rings of the mould are separated from contact with the roller shaft, and the weight of the mould and its contents are supported by the roller shaft as schematically illustrated in Fig. 4. If the rotation of the mould and the roller were terminated with this condition prevailing, the roller shaft would impress a longitudinal groove in the inner surface of the material. This result is avoided by gradually breaking the contact of the roller shaft with the moulding material as the mould and roller continue to rotate. This is accomplished by simultaneously expanding the jacks 37 to cause the wheels 42, 43, on the cradles to engage and gradually raise the mould as the rotation of the mould continues.

By gradually relieving the weight of the mould and contents from support by the roller shaft, the roller shaft effects a smooth continuous surface around the inner circumference of the moulded material. When the moulded surface is clear of the roller shaft, the rotation of the roller shaft is discontinued.

After the mould is raised sufficiently to clear the collars 46 and 47, the carriage may be moved along the rails 18, endwise away from the roller shaft. The mould is then lifted from the carriage. With an empty mould disposed on the cradles the carriage is ready to be moved back to the position illustrated in Fig. 1 preliminarily to another moulding operation.

While the form of apparatus herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. Apparatus for forming a hollow body of concrete or the like, comprising a hollow rotary mould having spaced-apart annular members extending radially inwardly of the outer moulding surface of said mould, a roller for rotating said mould, said roller extending through said mould and suspending said mould by engaging said annular members, means rotatably supporting one end of said roller, said roller-supporting means including bearing means mounted on a fixed support adjacent one end of said mould, a movable carriage positionable beneath said roller, bearing means mounted on said carriage for rotatably supporting the other end of said roller, means mounted on said carriage for supporting said mould, and means for elevating and depressing said mould-supporting means and operable when elevating, with said mould-supporting means engaging said mould, to relieve the weight of said mould from said roller and transfer the same to said carriage.

2. The combination set forth in claim 1 in which said means mounted on the carriage for supporting the mould comprises a cradle and wheels journalled in the cradle for engaging said mould, said wheels being rotatable on axes parallel to the axes of rotation of said mould and said roller.

3. The combination set forth in claim 1 in which said elevating and depressing means comprise jacks mounted on said carriage.

4. In a method for forming a hollow moulded body in an open-ended mould which is rotated by a rotating shaft extending through and engaging said mould, the steps comprising rotating said shaft and said mould and supplying cementitious material to the rotative mould until the material contained in said mould contacts with said shaft and raises the mould from engagement with the shaft as the mould and the shaft rotate, then gradually raising the rotating mould, and so gradually relieving the weight of the mould and its contents from the shaft, until the mould is raised sufficiently for the material contained in the mould to part from contact with the shaft and the shaft clears the interior surface of the moulded material without leaving an appreciable impression from the shaft.

5. In a method for making a concrete pipe in a mould having a cylindrical mould wall and rings within the mould wall which bear upon a rotatable roller extending through the mould, the steps of rotating the roller and the supported mould while supplying concrete to the mould in such quantity as to form a hollow concrete body having a wall thickness determined by the depth of the mould space between the mould wall and the roller when the rings run on the roller, supplying additional concrete to the mould while continuing the rotation of the mould and the roller and thereby shifting the reaction of the roller from on the rings to on the concrete in the mould as the thickness of the concrete within the mould becomes greater than the thickness attainable when the weight of the mould and its contents is transmitted through the rings to the roller, and then gradually raising the mould and its contents with respect to the roller as the mould is rotating and thereby gradually relieving the pressure between the roller and the concrete until contact between the concrete and the roller is broken.

References Cited in the file of this patent

UNITED STATES PATENTS

| 1,521,264 | Zehnder | Dec. 30, 1924 |
| 1,550,126 | Tompkins | Aug. 18, 1925 |
| 1,927,467 | Morgan | Sept. 19, 1933 |
| 2,449,900 | Johnston | Sept. 21, 1948 |
| 2,724,886 | Kennison et al. | Nov. 29, 1955 |

FOREIGN PATENTS

| 167,877 | Austria | Mar. 10, 1951 |
| 491,881 | Canada | Apr. 7, 1953 |
| 606,534 | Great Britain | Aug. 16, 1948 |
| 658,548 | Great Britain | Oct. 10, 1951 |